March 29, 1960 W. M. WILSON 2,930,117
METHOD OF SEAM BRAZING PLASTIC COATED FOURDRINIER WIRE
Filed Dec. 20, 1956
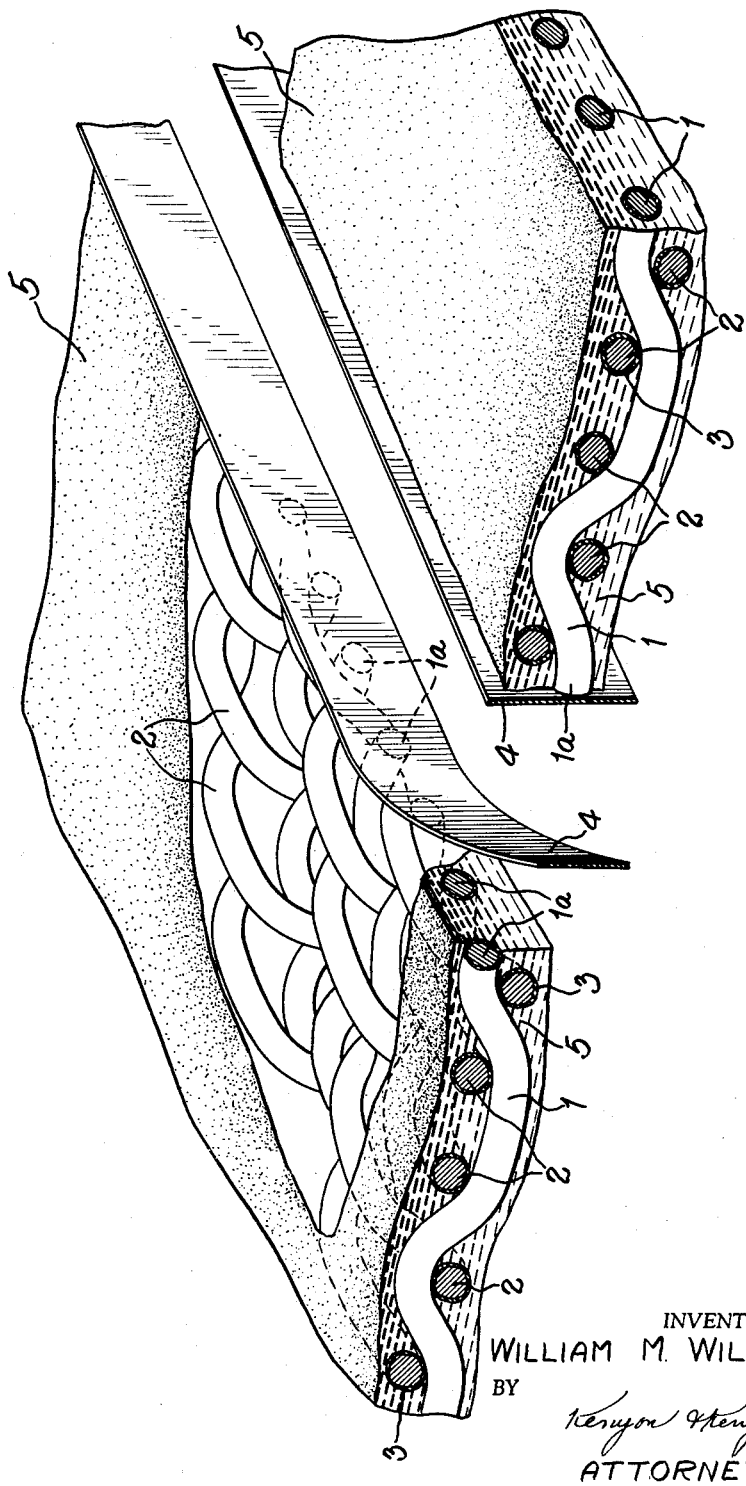
INVENTOR.
WILLIAM M. WILSON
BY
*Kenyon & Kenyon*
ATTORNEYS

United States Patent Office 2,930,117
Patented Mar. 29, 1960

2,930,117

METHOD OF SEAM BRAZING PLASTIC COATED FOURDRINIER WIRE

William M. Wilson, Allwood, N.J., assignor to Eastwood-Nealley Corporation, Belleville, N.J., a corporation of New Jersey Application December 20, 1956, Serial No. 629,748

6 Claims. (Cl. 29—527)

This invention is particularly concerned with seaming plastic coated Fourdrinier wire although its principles may prove to be applicable to the seaming of any fine wire fabric having part or all of the wires coated with a plastic covering.

The seaming with which the present invention is particularly concerned is of the character disclosed by the N. W. Webb Patent 2,100,294, issued November 23, 1937. In other words, brazing is contemplated which involves heating the wires to temperatures above the melting temperatures of available plastics with this heating extending away from the zone of brazing for an appreciable distance. Any plastic coating on the wires is subject to deformation or total destruction because of this heating.

A very recent development is Fourdrinier wire comprising a twill weave of metal warp and shoot wires with the shoot wires at least, and possibly the warp wires, covered with a thin coating of plastic applied prior to the weaving. The plastic coating may be any poly-amide or flurocarbon plastic providing a non-conductive coating. The well known "Nylon" may be used. The use of this plastic coating provides unusual and advantageous results in connection with both the weaving and the wire and the wire itself as a final product. The wire is, of course, used on the well known Fourdrinier paper machines in the form of an endless belt which necessitates seaming the wire after an appropriate length is produced by the loom.

Seaming by the method and machine disclosed by the mentioned Webb patent has been very satisfactory in connection with uncoated Fourdrinier wire and it is desirable to use these time-tried patented principles in connection with seaming this novel plastic coated wire. However, it is obvious that the heat of the brazing flame will melt the plastic coating on the Fourdrinier wire in the vicinity of the brazing zone. Removal of the plastic coating changes the drainage characteristics and surface characteristics of the Fourdrinier wire so as to water mark the paper produced by the Fourdrinier machine. Furthermore, removal of the coating changes the appearance of the wire throughout the seam area and detracts from the overall appearance of the product.

With the foregoing in mind one of the objects of the present invention is to provide a way to seam this plastic coated Fourdrinier wire without any appreciable destruction of the plastic coating adjacent to the seam area. It is desired to attain this object while permitting the method and machine of the mentioned Webb patent or possibly other brazing machines and methods.

The single figure of the accompanying drawing illustrates the principles and operation of the present invention, this figure showing on a greatly enlarged scale the adjacent ends of the described new Fourdrinier wire as these ends are treated in accord with the present invention.

In this drawing both the warp wires 1 and the shoot wires 2 are shown as being covered by a very thin coating of plastic 3. In some instances only the shoot wires may be covered with this coating but when the warp wires are also covered with the coating the brazing problem is, of course, made more difficult.

In accord with the present invention the Fourdrinier wire is shown with the twill weave. It is cut in the usual manner so as to provide warp wire end portions 1a which are as long as possible so that their ends may be brazed in the fashion of the mentioned Webb patent.

To practice the invention the end surfaces of the warp wires 1a are first protected by adhesive tape 4. This may be carefully applied cellophane tape having a suitable pressure sensitive adhesive, such as the cellophane tape sold under the well known trademark "Scotch," although comparable tape of other makers may be used.

With the end edges of the warp wires 1a protected by the carefully applied tape 4, a very heavy steam cylinder oil 5 is painted over the Fourdrinier wire right up to the tape 4 and for a suitable distance backwardly therefrom along the length of the Fourdrinier wire. Generally speaking, with Fourdrinier wire using warp and shoot wire diameters generally within the known commercial size ranges, this distance may be in the neighborhood of ¼ inch away from each of the tapes 4. Another way of putting it is to say that the Fourdrinier wire should have the oil applied so as to cover about three or four of the shoot wires most adjacent to the tape 4. The tapes 4 protect the end edges of the warp wires.

Although any petroleum oil of proper viscosity may be used, steam cylinder oil is a well known grade that has proven to be suitable. The oil used must in any event be viscous enough to fill and remain in the holes in the mesh right up to the tapes 4, but the oil should not be so viscous as to prevent it from flowing and covering all of the surfaces of the plastic coating. The flash point of the oil must be above brazing temperatures, although in this connection the so-called brazing metal used to seam Fourdrinier wire is actually a hard silver solder, so the temperatures encountered are not unduly excessive.

After the application of the oil the tapes 4 are carefully removed so as to expose the clean ends of the warp wires ready for brazing. Brazing may then follow in the manner of the mentioned Webb patent. The tapes may be removed just in advance of the brazing machine although with oil of suitable viscosity no trouble has been experienced with the oil flowing over the exposed warp wire ends. Steam cylinder oil of a heavy grade is particularly effective since it is deliberately designed for high temperature service.

During the brazing the oil insulates the plastic coating on the warp and shoot wires from radiant heat produced by the flame and heated solder. Although the brazing flame generally appears to be blue its tip becomes incandescent during the brazing and radiates heat which would otherwise melt the plastic coating. Due to the fine wire size, characteristic of Fourdrinier wire, the warp wires do not conduct enough heat away from the brazing zone to cause trouble, it being radiated heat which plays the major part in melting the plastic coating in the absence of the oil. What heat is conducted by the warp wires is dissipated in the oil which surrounds the warp wires and the brazing progresses fast enough to prevent the attainment of a temperature melting the plastic. Incidentally, this (melting) temperature may be considered as being in the neighborhood of 250° F.

After the brazing is completed the oil may be easily removed by a suitable solvent. When using the very heavy steam cylinder oil, the solvent used in actually practicing the present invention has been methyl-ethyl-ketone but any non-greasy solvent may be used. After the oil is washed away it will be found that the plastic coating on the shoot wires has not been materially or appreciably affected. If the warp wires are plastic coated they will be affected very little if at all. Incidentally, in addition to the reasons already explained for preserving the plastic coating, an even more important reason is that melting of the plastic coating may result in the plastic filling the mesh openings. Obviously this trouble would be very serious and must be avoided.

In accord with the mentioned Webb patent, the brazing is effected by using a strand or strands which is coated with the brazing metal initially and to which the warp wire ends are brazed. This strand or strands remains in the seam and obviously is not plastic coated. This alters the appearance slightly particularly if the silver solder component tarnishes as it tends to do with storage. Therefore, it may be desirable to paint or spray a plastic coating on such strand or strands, this preferably being followed by air blasting to clear any of the mesh holes which may become filled inadvertently with the plastic.

In some instances it may be desirable to weave by hand at least one shoot wire into the seam construction. If this is done such hand woven shoot wire should be plastic coated prior to the weaving so as to simulate the construction of the balance of the Fourdrinier wire.

Incidentally, it is immaterial whether the warp wires are of the round or flat types. Although a petroleum oil has been used in practicing the present invention, it is possible that some other heavy, viscous liquid might also be used. The requirements are that the viscosity be proper to permit enough flow for complete surface coverage of the wires combined with the ability to cling and fill the mesh openings, an ability to resist the brazing temperatures and the liquid must be removable by a suitable solvent in such a manner as not to chemically affect the Fourdrinier wire. Also, the liquid should not tend to flow over the ends of the wires after the tapes are removed.

Generally speaking, the type of petroleum that has been found to be particularly suitable has a specific viscosity at 100° C. of 1.79 up to 4.050, and a flash point of from 405 to 565° F. This oil works satisfactorily with the new plastic coated Fourdrinier wire. This wire is characterized by the plastic coated shoot wire which has a diameter ranging from .005" to .018", the warp wire diameters which are substantially within the same range as to diameter, and with the fabric having a warp wire count of from 40 to 50 wires per inch and a shoot wire count of from 30 to 90 wires per inch. The plastic coating on the shoot wire is relatively thin, it ranging from .0015" to .003" in thickness. The warp wires may or may not carry a similar plastic coating.

I claim:

1. A process for seam brazing woven wire fabric having a plastic coating which melts when subjected to brazing heat, said process including applying a liquid to the fabric throughout a zone extending from the brazing location to a substantial distance away therefrom, said liquid being substantially stable at the high temperatures resulting from the brazing heat and having a viscosity causing the liquid to flow into and remain in the mesh openings of the fabric, and brazing the seam by application of heat from a gas torch while said liquid is applied to said fabric.

2. A process for seam brazing woven wire fabric having a plastic coating which melts when subjected to brazing heat, said process including applying a liquid to the fabric throughout a zone extending from the brazing location to a substantial distance away therefrom, said liquid being substantially stable at the high temperatures resulting from the brazing heat and having a viscosity causing the liquid to flow into and remain in the mesh openings of the fabric, and brazing the seam while said liquid is applied to said fabric, the ends of the individual fabric wires to be joined by the seam being protected by a covering during the application of said liquid and said covering being removed prior to said brazing so as to leave said ends clean and with said liquid otherwise applied to said fabric.

3. A process for seam brazing Fourdrinier wire having at least its shoot wires coated with a plastic which melts when subject to the brazing heat, said method including applying a covering to the ends of the warp wires, applying a liquid to the warp and shoot wires throughout a zone extending from said ends for a substantial distance transversely from the seam and throughout the length of the seam, said liquid being substantially stable when subjected to the brazing heat and having a viscosity causing it to flow into and cling in the mesh openings of the warp and shoot wires and to remain on the surfaces of said wire, removing said covering to expose said ends and joining said ends by brazing.

4. A process for seam brazing Fourdrinier wire having at least its shoot wires coated with a plastic which melts when subject to the brazing heat, said method including applying a covering to the ends of the warp wires, applying a liquid to the warp and shoot wires throughout a zone extending from said ends for a substantial distance tranversely from the seam and throughout the length of the seam, said liquid being substantially stable when subjected to the brazing heat and having a viscosity causing it to flow into and cling in the mesh openings of the warp and shoot wires and to remain on the surfaces of said wire, removing said covering to expose said ends and joining said ends by brazing, said liquid being a very heavy steam cylinder oil.

5. A process for seam brazing Fourdrinier wire having at least its shoot wires coated with a plastic which melts when subject to the brazing heat, said method including applying a covering to the ends of the warp wires, applying a liquid to the warp and shoot wires throughout a zone extending from said ends for a substantial distance transversely from the seam and throughout the length of the seam, said liquid being substantially stable when subjected to the brazing heat and having a viscosity causing it to flow into and cling in the mesh openings of the warp and shoot wires and to remain on the surfaces of said wire, removing said covering to expose said ends and joining said ends by brazing, said liquid being removed after the wires have been brazed, said brazing including heating by means of a gas torch and the use of a metal strand covered with brazing metal and which remains in the seam, and said strand being subsequently coated with plastic similar to that with which said shoot wires are coated.

6. A process for seam brazing Fourdrinier wire having at least its shoot wires coated with a plastic which melts when subject to the brazing heat, said method including applying a covering to the ends of the warp wires, applying a liquid to the warp and shoot wires throughout a zone extending from said ends for a substantial distance transversely from the seam and throughout the length of the seam, said liquid being substantially stable when subjected to the brazing heat and having a viscosity causing it to flow into and cling in the mesh openings of the warp and shoot wires and to remain on the surfaces of said wire, removing said covering to expose said ends and joining said ends by brazing, said warp wires also being coated with said plastic and after said brazing said warp wires being recoated with plastic at least at their brazed junctions.

References Cited in the file of this patent

UNITED STATES PATENTS

| | | |
|---|---|---|
| 469,897 | Grant et al. | Mar. 1, 1892 |
| 2,100,294 | Webb | Nov. 23, 1937 |
| 2,115,127 | Smith | Apr. 26, 1938 |
| 2,262,901 | Murphy | Nov. 18, 1941 |
| 2,473,887 | Jennings et al. | June 21, 1949 |
| 2,813,502 | Drom | Nov. 19, 1957 |